May 30, 1961
R. A. BRODING
2,986,442
ELECTROPHOTOGRAPHIC OSCILLOGRAPH FOR
OBSERVING SLOW RECURRENT SIGNALS
Filed July 19, 1956
2 Sheets-Sheet 1
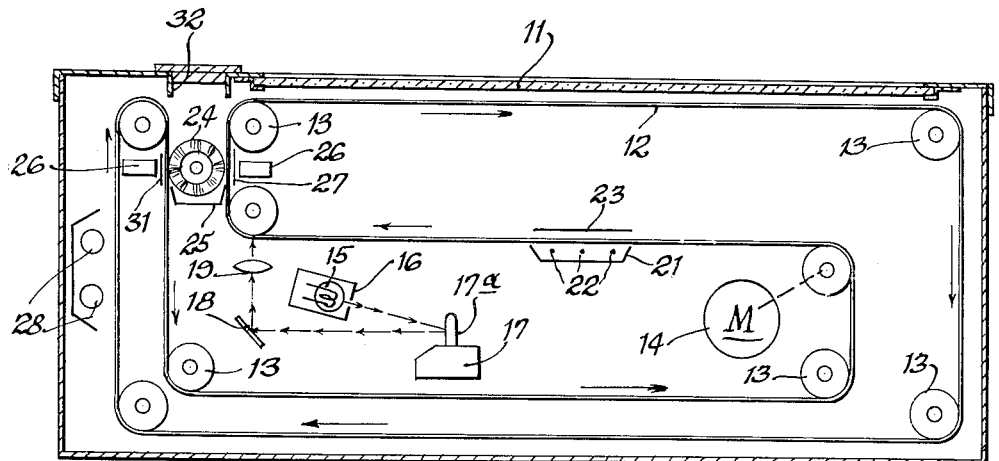
FIG. 1
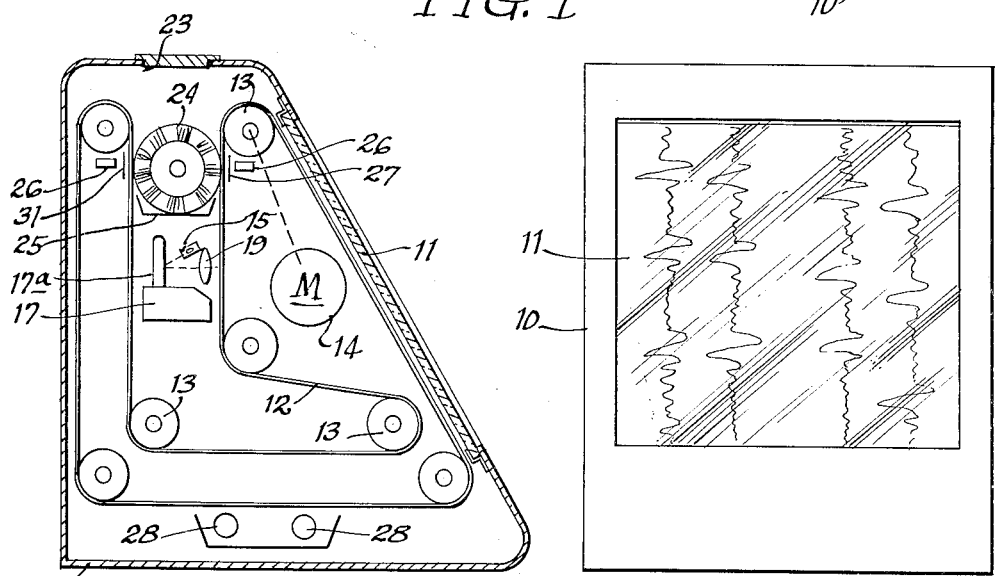
FIG. 2
FIG. 3
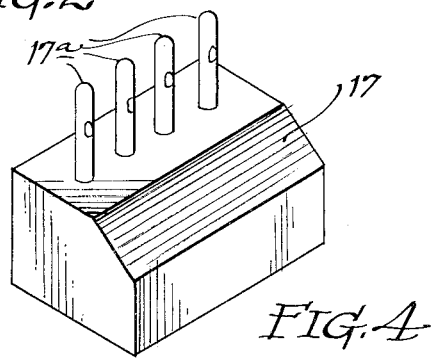
FIG. 4
INVENTOR.
Robert A. Broding
BY Ooms, McDougall,
Williams & Hersh
Attorneys

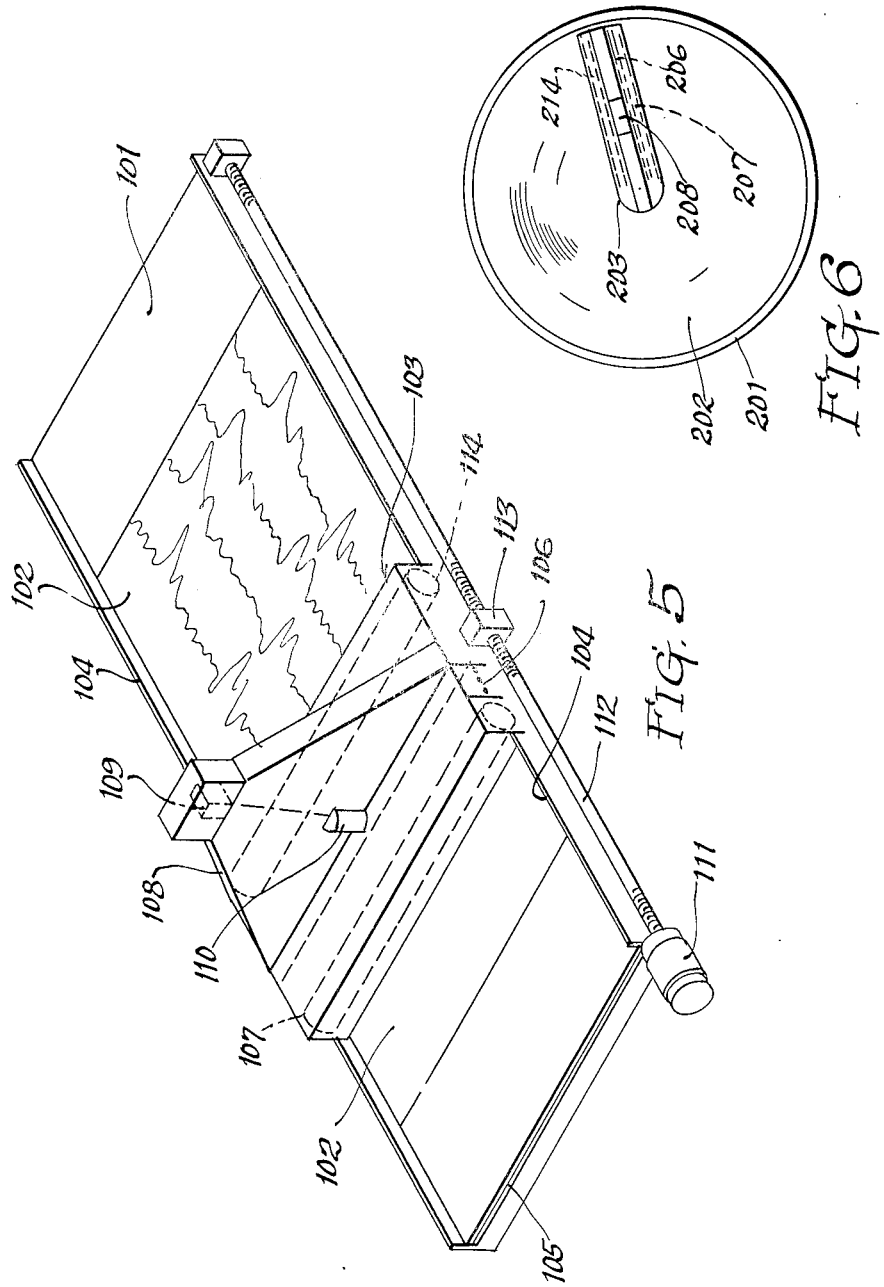

United States Patent Office 2,986,442
Patented May 30, 1961

2,986,442

ELECTROPHOTOGRAPHIC OSCILLOGRAPH FOR OBSERVING SLOW RECURRENT SIGNALS

Robert A. Broding, Tulsa, Okla., assignor, by mesne assignments, to Century Geophysical Corporation, Tulsa, Okla., a corporation of Delaware Filed July 19, 1956, Ser. No. 598,860

2 Claims. (Cl. 346—74)

This invention relates to oscillographs and is specifically directed to an electrophotographic oscillograph designed for visual presentation of slowly recurrent signals such as repetitive seismic signals, radar signals, and other recurrent electrical impulses indicative of physical phenomena.

In recent years apparatus for visual presentation of repetitive data has usually made use of cathode-ray tubes, and for many purposes such tubes have been extraordinarily well adapted. Thus, cathode-ray oscillographs are admirably suited for displaying visually the wave forms of complex alternating voltages and currents wherein the repetition rate is high enough to produce a persistence-of-vision effect.

Cathode-ray tubes have also been used in apparatus designed for visual presentation of slowly recurrent data. An example of such an application is radar equipment wherein a wide angle of arc is periodically scanned by a radar beam and the resulting information displayed on the face of a cathode-ray tube at a repetition rate of perhaps once per minute. Another example of the same sort is the so-called "bearing-distance indicator" used with sonar equipment for presenting visually the pattern of underwater sound echoes obtained in the course of scanning a zone of water surrounding a ship.

To employ cathode-ray tubes for such visual-display applications has required the use of extremely long-persistence screens. While phosphors having long-persistence characteristics have been well known for a number of years, they are not wholly satisfactory in practice, because they are all characterized by extremely rapid initial decay. That is, a cathode-ray tube having a long-persistence screen will glow very brilliantly at the point of writing and will then drop off in brilliance very rapidly after the scanning beam has passed.

As a result of this characteristic, visual observation of long-persistence screens is difficult, because the scanning of the electron beam across the face of the tube is accompanied by a very brilliant light which dulls the sensitivity of the observer's eyes and makes it difficult to pick out detail in the dimmer parts of the screen on which data have been recorded.

In the present invention I have provided an instrument employing electrophotographic principles which has proved far more satisfactory for the visual presentation of slowly recurrent signals than the cathode-ray apparatus of the prior art.

A major object of the present invention is to provide an oscillograph apparatus wherein a signal varying slowly with time is plotted for visual observation without any decay in the intensity of the plot with passage of time.

Another object of the invention is to provide, in an oscillograph for visual presentation of slowly changing quantities, means whereby a signal can be plotted as a function of time at a constant image intensity and the image be promptly thereafter erased and replaced by a new image indicative of the subsequent value of the quantity.

Still another object of the invention is to provide, in an oscillograph of the type described, means whereby any given image representative of a slowly changing quantity can be held in existence indefinitely for detailed study.

Other objects and advantages of the invention will appear from the following description of certain specific embodiments thereof.

In the appended drawing I have shown diagrammatically three typical embodiments of my invention, all of which embody the basic principles of the invention but which differ one from another in structural respects. In the drawing, Figure 1 is a diagrammatic sectional view showing a form of my invention in which data presentation takes place on a flat horizontal screen. Fig. 2 is a diagrammatic sectional view of an alternative embodiment of the invention in which the viewing screen is disposed at an angle for convient visual observation. Fig. 3 is a diagrammatic elevation view of the viewing screen of the Fig. 2 form of my invention, showing the appearance of a typical oscillogram produced thereby. Fig. 4 is a perspective view showing the appearance of a typical mirror-galvanometer unit suitable for incorporation in my invention. Fig. 5 is a diagrammatic perspective view of a third form of my invention in which data presentation takes places on a horizontal plotting board. Fig. 6 is a diagrammatic sketch showing how the apparatus of Fig. 5 may be modified to provide data presentation on a circular plotting board, analogous to the plan position indicator widely used in the radar art.

In Fig. 1, my invention is shown enclosed in a suitable box-like housing 10 which is relieved over the major part of its top surface, a transparent protective plate 11 being fitted into the relieved zone. A long endless belt 12 is carried within the housing on a plurality of rollers 13, at least one of which is mechanically coupled to a driving motor 14 by means of which the belt can be moved uniformly over the rollers at a predetermined speed or, if desired, at any predetermined speed within a suitable range.

The belt 12 is made of a suitable flexible but substantially non-stretching base material which may be plastic, rubber, impregnated cloth, or even metal. The belt 12 is coated on one surface with an electrosensitive coating material such as zinc oxide particles suspended in a silicone resin binder. Such coatings are well known in the electrophotographic art and have the properties of (1) taking on an electrostatic charge when subjected in darkness to an electric field and (2) becoming partially or wholly discharged by exposure to light, the degree of discharge being within wide limits proportional to the intensity of the impinging light. Exposure of such a coating to light after it has been charged in darkness will produce on the surface of the coating an electrostatic latent image of the light pattern.

In the apparatus of Fig. 1, the electrosensitive coating is carried on the surface of belt 12 which is exposed to view under the viewing plate 11.

To produce on the surface of the belt 12 a latent image representative of the data to be observed I provide an optical system consisting of a lamp 15 enclosed in a housing 16 and provided with a small aperture from which a beam of light is directed upon the mirrors of a galvanometer unit 17. Light beams reflected from the one or more mirrors 17a of the galvanometer unit 17 are reflected from a plane mirror 18 through a collimating lens 19 onto the electrosensitive surface of belt 12.

The data to be studied by my oscillograph is converted into one or more varying electrical currents by means well known in the art, and the respective currents are applied to the galvanometer windings in unit 17. Changes in the respective currents will produce rotation of the respective mirrors 17a, so that the value of the currents as a function of time will be plotted on the electrosensitive surface of belt 12 in the form of linear latent images in which time is represented longitudinally and the current values are represented by varying degrees of lateral displacement.

The use of light-beam galvanometers as oscillograph elements is broadly well known in the art, so detailed description of the galvanometer unit 17 is unnecessary. To prepare the electrosensitive surface of belt 12 to receive a latent image from the galvanometer-controlled light beams, the belt 12 passes over a charging tray 21 containing a plurality of grid wires 22. A conducting back plate 23 is mounted above the belt directly over the charging tray 21, and a powerful electrostatic field produced by a suitable high-voltage power supply (not shown) is developed between the grid wires 22 and the back plate 23, resulting in the charging of the electrosensitive surface of belt 12 to a high negative potential. The portions of the photosensitive belt surface thus charged will retain their charge until exposed to light.

After an electrostatic latent image is produced on the sensitive belt surface by the light from lamp 15 as reflected from the galvanometer mirrors 17a, the image-carrying belt passes through a developing zone comprising a rotary magnetic brush 24. The lowermost portions of brush 24 pass closely over a pan or tray 25 containing a dust consisting of a mixture of iron powder and a dye-coated thermoplastic powder.

The magnetic brush 24 is composed of a series of radially corrugated washers mounted for rotation between a pair of magnets 26. The thermoplastic powder adheres to the iron by surface attraction and the iron powder, in turn, is attracted to the washers of brush 24 by the field of the magnets 26. As a result, the brush picks up the powder from pan 25 and brushes or spreads it lightly over the sensitive surface of the belt 12. An electrode 27 mounted on the opposite side of belt 12 from the brush 24 is electrically charged to bias the belt relative to the brush 24. Since the electric potential of the light-exposed areas of the sensitive belt surface is substantially different from the potential of the powder and the unexposed areas, the powder is attracted by electrostatic force to the exposed areas and thus produces on the surface of the belt a visible image corresponding to the latent image.

The visible image thus produced on the sensitive surface of belt 12 will of course not be affected by further exposure of the belt to light, so that the visual image can be viewed through the transparent plate 11.

It will of course be understood that the belt surface must be shielded from outside light during the portion of its travel in which it is charged, exposed to the light from the galvanometer mirrors, and developed. This may be done by providing a suitable shroud or light shield (not shown) within the appropriate portions of housing 10.

In the embodiment of Fig. 1, the motor 14 will be operated until the belt 12 has been advanced for a distance sufficient to record a seismogram or other oscillogram of the data being studied. The motor 14 can then be stopped and the oscillogram studied at leisure.

When another oscillogram is desired, motor 14 is again started and the belt is again advanced sufficiently to produce a new oscillogram and to dispose it in appropriate position under the viewing plate 11. Meanwhile, the portion of the belt containing the first oscillogram advances over the rollers 13 and out of view. As the belt 12 is successively advanced, the theretofore exposed portions of the sensitive surface of belt 12 are passed in front of a bank of high-intensity electric lamps 28 which exposes the entire sensitive surface to brilliant illumination and thereby insures that all accumulated charge on the areas of the belt thus illuminated has been dissipated. The discharged belt surface next progresses to the back side of brush 24 where the powder theretofore deposited on it is wiped off and the visible image on the belt is thereby eradicated. To assist in the eradication of the visible image on the belt, a back plate 31 is used, its potential being adjusted relative to that of the brush 24 so as to produce electric-field forces tending to make the powder transfer off the belt onto the brush. Thus, the portions of the belt 12 which pass beyond the back side of brush 24 are clean and are again ready for re-charging, exposure, and development of a new oscillogram.

My instrument, of course, may be operated periodically or, if desired, may be run continuously, so that a uniformly moving oscillogram of the data being studied passes slowly under the viewing plate 11.

When the colored powder (often called "toner") is brushed off the sensitive surface of belt 12 by the back side of brush 24, most of it will adhere to the brush and the remainder will drop back into pan 25.

From time to time an additional supply of toner powder may be added to brush 24 and pan 25 by introduction through the capped opening 32 in the top of housing 10.

In Fig. 2 I have illustrated an alternative construction which may be employed for an electrophotographic oscillograph in accordance with my invention, the various components and reference numerals in Fig. 2 being the same as for Fig. 1. As may be noted from examination of Fig. 2, the parts in that form of the invention are so arranged as to provide a more compact cabinet suited for desk-top use, the viewing screen in the Fig. 2 form of the invention being located on the slanting front face of the instrument.

Fig. 3 is a diagrammatic front view of the Fig. 2 form of my invention, showing the appearance of a typical oscillogram. As one views the screen through transparent plate 11, one sees a graphic plot of the various quantities being recorded, time in this instance being represented vertically and the value of the varying quantities being indicated by horizontal displacement of the traces. In Fig. 3 I show an oscillogram produced by a galvanometer unit having four mirror elements, permitting simultaneous display of four distinct quantities at the same time. In operation, the moving endless belt 12 will pass slowly under the view plate 11 from top to bottom.

In Fig. 5 I have shown an embodiment of my invention in which the oscillograms are plotted on a large fixed plotting board 101, the plotting board being covered by an electrosensitive surface 102 which is stationary. In this form of the invention the oscillograph apparatus is carried within a movable carriage 103 which is mounted on parallel rails 104 along the opposite longitudinal edges of the board 101.

Under the electrosensitive surface 102 I provide a conducting back plate 105 which cooperates with the high-voltage grid 106 which is built into and carried by the carriage 103. A high-voltage potential difference is produced between the grid 106 and back plate 105 by a suitable power supply (not shown).

A magnetic brush 107 is mounted within the carriage 103 with its axis disposed transversely of the plotting board 101. This brush performs the wiping or cleaning function achieved by the back side of brush 24 in the Fig. 1 embodiment. A scanning head 108 is mounted on the carriage 103 immediately behind the charging grid 106, scanning head 108 comprising a light-beam galvanometer unit 109 and a light source 110.

The light source may be modulated if desired in any of the many ways known to the art so as to provide intensity variations which may either indicate time units or may be employed to supply significant data regarding one of the varying quantities being observed and correlated. (It will of course be understood that a modulated light source may also be employed in any of the other embodiments of my invention herein described.)

Any suitable means may be employed for systematically moving the carriage 103 longitudinally along the plotting board, such as by the motor 111 and the screw 112, cooperating with a suitable threaded element 113 carried by the carriage 103.

The carriage is also provided with a magnetic brush 114 mounted similarly to brush 107 but disposed behind the scanning head 108 rather than ahead of it.

In the operation of this form of my invention, the carriage 103 moves systematically along the length of the plotting board, the sensitive surface 102 being progressively wiped clean by brush 107, charged by grid 106, and scanned by the one or more light beams reflected from the mirror galvanometer unit 109. The latent image thus formed on the sensitive surface is developed with toner powder by magnetic brush 114, and the result is an oscillogram progressively built up on the portion of sensitive surface 102 which has been passed over by the moving carriage.

After the oscillogram has been completed by movement of the carriage 103 from end to end of the plotting board, it may be moved back again to its starting point and production of a new oscillogram commenced. While the embodiment shown in Fig. 5 is uni-directional, it will be apparent to those skilled in the art that the instrument can be made bi-directional by adding a second charging grid 106 adjacent brush 114, the brushes 107 and 114 in such construction being used alternately for cleaning or developing, depending on the direction of traverse.

An oscillograph embodying the principles of the Fig. 5 embodiment can be particularly useful in applications, such as detection of underwater objects by sound echoes, in which continuous scanning at a slow rate is desired and in which data presentation by means of polar coordinates is convenient. Such an oscillograph is diagrammatically shown in Fig. 6.

In the Fig. 6 structure an electrosensitive surface 202 is provided on a circular plotting table 201, the movable carriage 203 being in this instance mounted for rotational movement around an axis passing perpendicularly through the center of the plotting board 201. A scanning head 208, a cleaning or wiping brush 207, a charging grid 206, and a developing brush 214 are built into the rotating carriage 203 in the same relative positions that the corresponding elements occupy in the Fig. 5 embodiment. If plan position indication is desired, the galvanometer unit in the scanning head 208 will be supplied with a current of sawtooth wave form synchronized with the transmitted pulses whose echoes are to be detected. The rate of rotation of the carriage 203 is synchronized with the rotation of the exploring sound generator or other detecting device, and the light source in the scanning head 208 is modulated by the received echo signals, so that its intensity is increased or decreased, as the case may be, proportionally to the strength of received echoes.

The result, as is diagrammatically indicated on Fig. 6, is an oscillogram in which clear-cut, non-decaying traces are formed on the sensitized surface 202 corresponding to each received echo, the angular position of each trace being indicative of its bearing and the radial distance of each trace from the center of table 201 being indicative of the distance of the object from which the echo was derived.

As the scanning head 203 rotates it successively erases the oscillogram formed on the previous revolution and traces out a new oscillogram corresponding to the echo data being currently received.

Thus my invention provides a plan position indicator which may be rotated as slowly as desired without the decay problems and intense light-contrast problems encountered on plan position indicators using cathode-ray tubes.

Since in the Fig. 5 and Fig. 6 forms of my invention the entire electrosensitive surface is exposed to ambient light, except for the portion covered by the movable scanning head, it is usually unnecessary in those embodiments to employ any discharging lamps such as lamps 28 used in the embodiments of Figs. 1 and 2. Such lamps, however, may of course be incorporated in the movable head in any application where they are needed.

It will of course be understood that the applications suggested herein for the various embodiments of my invention are merely illustrative. Thus, for example, the Fig. 6 form of my invention need not be used as a plan position indicator but may if desired be employed as a simple oscillograph producing one or more concentric circular traces in applications wherein, for example, it is desired to provide a record of changes in quantities over a predetermined period of time. For example, the carriage 203 may be rotated at a continuous rate of one revolution per hour, in which event the oscillogram on surface 202 will at all times show the variations in the quantities being observed which have taken place during the hour immediately preceding observation.

In the various forms of the invention herein disclosed, I have used diagrammatic presentation and have omitted conventional details such as wiring, power supplies, etc., since such conventional structures do not per se form any part of my invention and are well known to persons acquainted with the oscillograph art and with the art of electrophotography in general.

Since many variations in and departures from the specific structures disclosed and described herein will occur to persons skilled in the art within the scope and spirit of my invention, it should be understood that the scope of my invention is not limited to the precise structures disclosed but is to be determined primarily by reference to the appended claims.

I claim:

1. Apparatus for producing an oscillogram wherein information is graphically plotted in polar coordinates comprising an electrophotosensitive surface, a scanning head having means for erasing a developed image from said surface, means for electrically charging said surface, illuminating means for producing an electrostatic latent image on said surface when electrically charged, and means for developing said latent image into a visible image, said scanning head being mounted for rotational movement over said surface around a fixed axis perpendicular to said surface, and means for rotating said head around said axis at a uniform rate whereby a substantially circular zone of said surface concentric with said axis is successively and repeatedly operated upon by said erasing means, said charging means, said illuminating means, and said developing means.

2. The apparatus defined in claim 1 wherein said illuminating means comprises a modulated light source and a mirror galvanometer positioned to reflect light from said source onto said surface.

References Cited in the file of this patent

UNITED STATES PATENTS

| 2,143,214 | Selenyi | Jan. 10, 1939 |
| 2,551,582 | Carlson | May 8, 1951 |
| 2,624,652 | Carlson | Jan. 6, 1953 |
| 2,692,178 | Grandadam | Oct. 19, 1954 |
| 2,756,676 | Steinhilper | July 31, 1956 |
| 2,777,745 | McNaney | Jan. 15, 1957 |
| 2,895,847 | Mayo | July 21, 1959 |